(12) United States Patent
Bialer et al.

(10) Patent No.: US 11,300,677 B2
(45) Date of Patent: Apr. 12, 2022

(54) AUTOMATED DRIVING SYSTEMS AND CONTROL LOGIC FOR HOST VEHICLE VELOCITY ESTIMATION USING WIDE APERTURE RADAR

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL); David Shapiro, Netanya (IL)

(73) Assignee: GM Global Technology Operations LLC, Detroit, MI (US)

(*) Notice: Subject to any disclaimer, the term of this patent is extended or adjusted under 35 U.S.C. 154(b) by 451 days.

(21) Appl. No.: 16/504,955

(22) Filed: Jul. 8, 2019

(65) Prior Publication Data
US 2021/0011150 A1 Jan. 14, 2021

(51) Int. Cl.
*G01S 13/931* (2020.01)
*G05D 1/02* (2020.01)
*G01S 13/60* (2006.01)

(52) U.S. Cl.
CPC ............ *G01S 13/931* (2013.01); *G01S 13/60* (2013.01); *G05D 1/0257* (2013.01); *G05D 2201/0213* (2013.01)

(58) Field of Classification Search
CPC ...... G01S 7/292–7/2928; G01S 13/931; G01S 13/66; G01S 13/72; G01S 13/726; G01S 13/60; G06K 9/6218; G06K 9/6267
See application file for complete search history.

(56) References Cited

U.S. PATENT DOCUMENTS

| 6,085,151 A | * | 7/2000 | Farmer | G01S 7/0232 |
| | | | | 701/301 |
| 6,140,954 A | * | 10/2000 | Sugawara | G01S 13/931 |
| | | | | 342/70 |
| 6,356,838 B1 | | 3/2002 | Paul | |
| 6,427,119 B1 | | 7/2002 | Stefan et al. | |
| 6,587,785 B2 | | 7/2003 | Jijina et al. | |

(Continued)

FOREIGN PATENT DOCUMENTS

DE 102014016567 A1 5/2016
WO 0220296 A1 3/2002

*Primary Examiner* — Peter M Bythrow
(74) *Attorney, Agent, or Firm* — Quinn IP Law

(57) ABSTRACT

Presented are target object detection systems for deriving host vehicle velocities, methods for making/using such systems, and motor vehicles with host vehicle velocity estimation capabilities. A method of automating operation of vehicles includes an electronic transmitter of a vehicle's target object detection system emitting electromagnetic signals, and an electronic receiver receiving multiple reflection echoes caused by each electromagnetic signal reflecting off target objects within proximity of the vehicle. A vehicle controller determines a relative velocity vector for each target object based on these reflection echoes. The relative velocity vectors are assigned to discrete vector clusters. The controller estimates a host vehicle velocity vector as an average of the relative velocity vectors in the vector cluster containing the most relative velocity vectors and having the largest spatial spread. The controller commands one or more vehicle systems to execute one or more control operations responsive to the host vehicle velocity vector.

20 Claims, 3 Drawing Sheets

(56) References Cited

U.S. PATENT DOCUMENTS

| | | | |
|---|---|---|---|
| 6,697,730 B2 | 2/2004 | Dickerson | |
| 7,598,904 B2 * | 10/2009 | Klotzbuecher | G01S 13/58 |
| | | | 342/107 |
| 7,840,427 B2 | 11/2010 | O'Sullivan | |
| 8,170,739 B2 | 5/2012 | Lee | |
| 8,364,334 B2 | 1/2013 | Au et al. | |
| 8,428,843 B2 | 4/2013 | Lee et al. | |
| 8,612,139 B2 | 12/2013 | Wang et al. | |
| 8,849,515 B2 | 9/2014 | Moshchuk et al. | |
| 9,014,915 B2 | 4/2015 | Chatterjee et al. | |
| 9,079,587 B1 | 7/2015 | Rupp et al. | |
| 9,099,006 B2 | 8/2015 | Mudalige et al. | |
| 9,139,204 B1 | 9/2015 | Zhao et al. | |
| 9,229,453 B1 | 1/2016 | Lee | |
| 9,283,967 B2 | 3/2016 | Lee | |
| 9,487,212 B1 | 11/2016 | Adam et al. | |
| 9,517,771 B2 | 12/2016 | Attard et al. | |
| 9,587,952 B1 | 3/2017 | Slusar | |
| 9,815,481 B2 | 11/2017 | Goldman-Shenhar et al. | |
| 9,868,443 B2 | 1/2018 | Zeng et al. | |
| 9,971,945 B2 | 5/2018 | Zhao et al. | |
| 9,972,206 B2 | 5/2018 | Zhao et al. | |
| 10,552,691 B2 * | 2/2020 | Li | G06K 9/00805 |
| 10,679,506 B2 * | 6/2020 | Szulc | G01S 17/931 |
| 10,832,418 B1 * | 11/2020 | Karasev | G06K 9/6267 |
| 10,890,919 B2 * | 1/2021 | Smith | G01S 7/06 |
| 2007/0219720 A1 * | 9/2007 | Trepagnier | G05D 1/0278 |
| | | | 701/300 |
| 2008/0040029 A1 * | 2/2008 | Breed | G01S 19/17 |
| | | | 701/514 |
| 2008/0046174 A1 | 2/2008 | Johnson | |
| 2009/0030885 A1 | 1/2009 | DePasquale et al. | |
| 2009/0140909 A1 * | 6/2009 | Wood | G01S 13/726 |
| | | | 342/27 |
| 2010/0228415 A1 | 9/2010 | Paul | |
| 2011/0059693 A1 | 3/2011 | O'Sullivan | |
| 2011/0190972 A1 * | 8/2011 | Timmons | G08G 1/166 |
| | | | 701/31.4 |
| 2011/0313880 A1 | 12/2011 | Paul et al. | |
| 2012/0101713 A1 | 4/2012 | Moshchuk et al. | |
| 2012/0239452 A1 | 9/2012 | Trivedi et al. | |
| 2013/0032421 A1 | 2/2013 | Bonne et al. | |
| 2013/0035821 A1 | 2/2013 | Bonne et al. | |
| 2013/0054128 A1 | 2/2013 | Moshchuk et al. | |
| 2013/0181860 A1 * | 7/2013 | Le | B60R 21/0134 |
| | | | 342/72 |
| 2013/0204676 A1 | 8/2013 | Hindi et al. | |
| 2013/0219294 A1 | 8/2013 | Goldman-Shenhar et al. | |
| 2014/0011522 A1 | 1/2014 | Lin et al. | |
| 2014/0022110 A1 * | 1/2014 | Itohara | G01S 13/72 |
| | | | 342/107 |
| 2015/0198711 A1 * | 7/2015 | Zeng | G01S 13/726 |
| | | | 342/59 |
| 2015/0353082 A1 | 12/2015 | Lee et al. | |
| 2015/0353085 A1 | 12/2015 | Lee | |
| 2016/0003938 A1 | 1/2016 | Gazit et al. | |
| 2016/0084944 A1 | 3/2016 | Bialer et al. | |
| 2016/0084953 A1 | 3/2016 | Stainvas Olshansky et al. | |
| 2016/0084954 A1 | 3/2016 | Bilik et al. | |
| 2016/0203374 A1 * | 7/2016 | Zeng | G06T 7/75 |
| | | | 382/104 |
| 2016/0231124 A1 | 8/2016 | Nickolaou et al. | |
| 2016/0320194 A1 | 11/2016 | Liu et al. | |
| 2016/0320195 A1 | 11/2016 | Liu et al. | |
| 2016/0320198 A1 | 11/2016 | Liu et al. | |
| 2016/0321566 A1 | 11/2016 | Liu et al. | |
| 2016/0321771 A1 | 11/2016 | Liu et al. | |
| 2017/0021830 A1 | 1/2017 | Feldman et al. | |
| 2017/0097412 A1 * | 4/2017 | Liu | G01S 13/726 |
| 2017/0293024 A1 | 10/2017 | Villeval et al. | |
| 2017/0371030 A1 | 12/2017 | Pokrass et al. | |
| 2018/0074191 A1 | 3/2018 | Bilik et al. | |
| 2018/0120419 A1 * | 5/2018 | Bialer | G01S 13/726 |
| 2018/0120429 A1 * | 5/2018 | Bialer | G01S 7/415 |
| 2018/0128912 A1 | 5/2018 | Bialer | |
| 2018/0128913 A1 | 5/2018 | Bialer | |
| 2018/0128916 A1 | 5/2018 | Bialer | |
| 2018/0128917 A1 | 5/2018 | Bialer | |
| 2018/0166794 A1 | 6/2018 | Raphaeli et al. | |
| 2018/0210067 A1 | 7/2018 | Bilik et al. | |
| 2018/0275264 A1 | 9/2018 | Bilik et al. | |
| 2018/0284220 A1 | 10/2018 | Bilik et al. | |
| 2018/0335787 A1 * | 11/2018 | Zeng | G05D 1/0274 |
| 2019/0101634 A1 * | 4/2019 | Baheti | G01S 7/415 |
| 2019/0302771 A1 * | 10/2019 | Borkowski | G01S 7/4808 |
| 2019/0310378 A1 * | 10/2019 | Ho | G06T 7/11 |
| 2019/0369222 A1 * | 12/2019 | Oh | G05D 1/101 |
| 2019/0369228 A1 * | 12/2019 | Stachnik | G01S 13/588 |
| 2019/0391250 A1 * | 12/2019 | Cohen | G01S 13/58 |
| 2020/0294257 A1 * | 9/2020 | Yoo | G06K 9/6288 |
| 2020/0301013 A1 * | 9/2020 | Banerjee | G01S 13/865 |
| 2020/0307561 A1 * | 10/2020 | Bush | B60W 30/09 |
| 2021/0156992 A1 * | 5/2021 | Nishikido | G01S 7/356 |

* cited by examiner

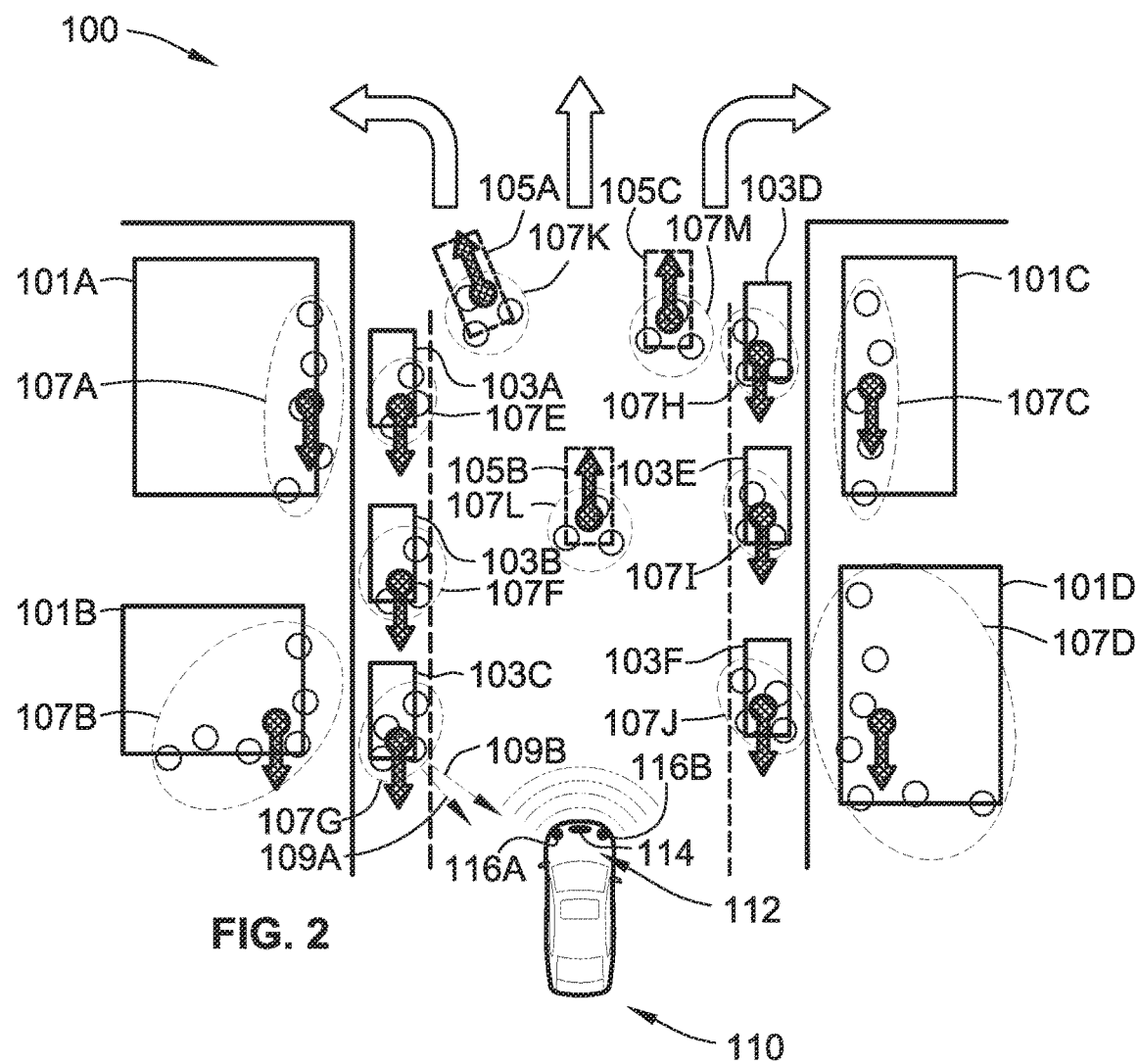
FIG. 2
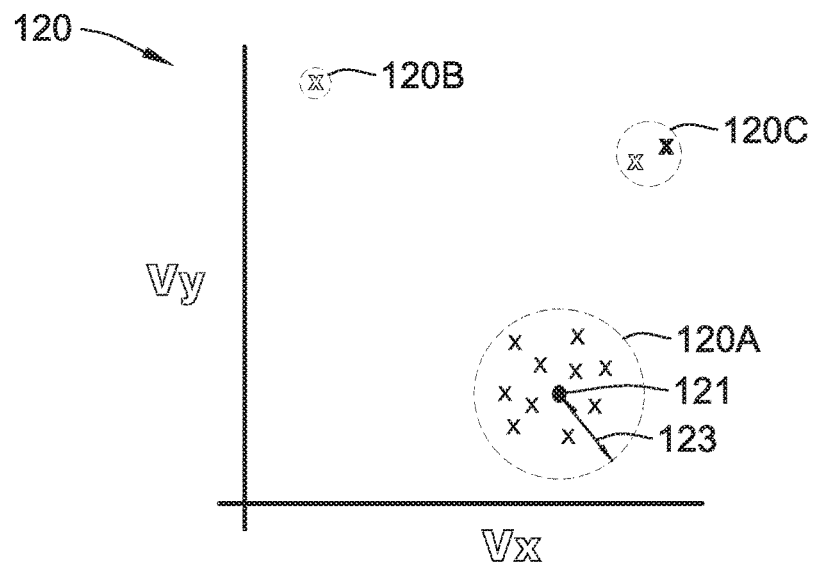
FIG. 3  Target Object Relative Velocity (mph)

AUTOMATED DRIVING SYSTEMS AND CONTROL LOGIC FOR HOST VEHICLE VELOCITY ESTIMATION USING WIDE APERTURE RADAR

INTRODUCTION

The present disclosure relates generally to motor vehicles with automated driving capabilities. More specifically, aspects of this disclosure relate to onboard sensing systems and adaptive logic for deriving host vehicle speed and trajectory.

Current production motor vehicles, such as the modern-day automobile, are originally equipped with or retrofit to include a network of onboard electronic devices that provide automated driving capabilities that help to minimize driver effort. In automotive applications, for example, the most recognizable type of automated driving feature is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing fore and aft spacing between the host vehicle and leading/trailing vehicles. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, and other Advanced Driver Assistance Systems (ADAS), along with autonomous driving features, are also available on many modern-day automobiles.

As vehicle processing, communication, and sensing capabilities continue to improve, manufacturers will persist in offering more system-automated driving capabilities with the aspiration of eventually producing fully autonomous vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ autonomous control systems to enable vehicle routing with steering, lane changing, scenario planning, etc. Automated route generation systems utilize vehicle state and dynamics sensors, map and road condition data, and path prediction algorithms to provide path derivation with automated lane center and lane change forecasting. Computer-assisted rerouting techniques offer predicted alternative travel routes that may be updated, for example, based on real-time and virtual vehicle data.

Many automobiles are now equipped with onboard vehicle navigation systems that utilize a global positioning system (GPS) transceiver in cooperation with navigation software and geolocation mapping services to obtain roadway topography, traffic, and speed limit information associated with the vehicle's current location. Autonomous driving and advanced driver assistance systems are often able to adapt certain automated driving maneuvers based on roadway information obtained by the in-vehicle navigation system. Ad-hoc-network-based ADAS, for example, may employ GPS and mapping data in conjunction with multi-hop geocast V2V and V2I data exchanges to facilitate automated vehicle maneuvering and powertrain control. During assisted and unassisted vehicle operation, the resident navigation system may identify a recommended travel route based on an estimated shortest travel time or estimated shortest travel distance between route origin and route destination for a given trip. This recommended travel route may then be displayed as a map trace or as turn-by-turn driving directions on a geocoded and annotated map with optional voice commands output by the in-vehicle audio system.

Automated and autonomous vehicle systems may employ an assortment of commercially available components to provide target object detection and ranging. In one example, radio detection and ranging (RADAR) systems detect the presence, distance, and/or speed of a target object by discharging pulses of high-frequency electromagnetic waves that are reflected off the object back to a suitable radio receiver. As another option, the vehicle may be furnished with a laser detection and ranging (LADAR) elastic backscatter system that emits and detects pulsed laser beams to make precise distance measurements. Synonymous to—and often used as the umbrella term for—LADAR-based detection is light detection and ranging (LIDAR) technology that determines distances to stationary or moving target objects using assorted forms of light energy, including invisible, infrared light spectrums (around 300-700 nanometers) and near-infrared laser light spectrums (around 900-1100 nanometers). In all three techniques, the range to an object is determined by measuring the time delay between transmission of a pulse and detection of the reflected signal.

SUMMARY

Disclosed herein are target object detection systems with attendant control logic for deriving vehicle speed and trajectory, methods for making and methods for operating such object detection systems, and intelligent motor vehicles with vehicle speed and trajectory estimation capabilities. By way of example, there are presented wide aperture radar systems and adaptive logic for accurately estimating velocity vectors of host vehicles. These systems and methods derive host vehicle velocity by demarcating between static and moving objects in proximity to the host vehicle and estimating the relative velocities of the static objects. A resident multiple input, multiple output (MIMO) radar system with wide aperture transceivers detects objects within proximity to the host vehicle and estimates reflection points and relative velocity vectors for these objects. The control system classifies a majority of the objects in proximity to the vehicle as static, and construes static objects as those having a relative spatial spread in angle and range. Each target object is categorized as either stationary or moving by identifying as static a majority of objects that are grouped inside a velocity vector cluster with a predetermined spatial spread in angle and range. A host vehicle velocity vector is estimated from an average of the relative velocities of the static objects within a select one of the velocity vector clusters.

Attendant benefits for at least some of the disclosed concepts include accurate ego-motion estimation for enhanced autonomous driving through improved host vehicle localization, object detection and tracking (e.g., occupancy grid mapping), and target object classification. As used herein, the term "ego-motion" may be defined to include the multi-directional motion of an object tracking system within a three-dimensional (3D) environment. In addition to improving host vehicle velocity estimation and target object tracking, disclosed features also help to extend CAS/ACC/FSRACC functionality to disparate roadway topographies and continuously changing driving scenarios.

ADAS and self-driving vehicle frameworks implementing disclosed object tracking and velocity estimation techniques help to enhance passenger comfort while minimizing risk of collision. Enhanced host vehicle velocity analysis also helps to ensure top-level automated driving performance, yielding more consistent and reliable system operation, without requiring the addition of dedicated sensors and hardware.

Aspects of this disclosure are directed to methods for making and methods for using any of the disclosed motor vehicles, automated driving systems, and/or target object detection devices. In an example, a method is presented for governing operation of a motor vehicle. This representative method includes, in any order and in any combination with any of the above and below disclosed options and features: emitting one or more electromagnetic signals via an electronic transmitter (e.g., a continuous wave or pulse-Doppler radio transmitter) of a target object detection system of the motor vehicle; receiving, via an electronic receiver (e.g., a wide aperture antenna array) of the target object detection system, multiple reflection echoes caused by each electromagnetic signal reflecting off of multiple target objects within proximity of the motor vehicle; determining, via a resident or remote vehicle controller based on the received reflection echoes, a relative velocity vector for each target object; the vehicle controller assigning the relative velocity vectors to discrete velocity vector clusters, each of which has a respective centroid and a respective spatial spread of the velocity vectors in that cluster to the centroid; estimating a host vehicle velocity vector of the motor vehicle as an average of the relative velocity vectors in a select velocity vector cluster containing the most relative velocity vectors and having the largest spatial spread; and the vehicle controller transmitting one or more command signals to one or more resident vehicle systems to execute one or more control operations responsive to the estimated host vehicle velocity vector.

Additional aspects of this disclosure are directed to motor vehicles with host vehicle velocity vector estimation capabilities. As used herein, the terms "vehicle" and "motor vehicle" may be used interchangeably and synonymously to include any relevant vehicle platform, such as passenger vehicles (e.g., combustion engine, hybrid, full electric, fully and partially autonomous, etc.), commercial vehicles, industrial vehicles, tracked vehicles, off-road and all-terrain vehicles (ATV), motorcycles, farm equipment, watercraft, aircraft, etc. For purposes of this disclosure, the terms "automated" and "autonomous" may be used synonymously and interchangeably to include vehicles and vehicle systems provisioning assisted and/or fully autonomous driving capabilities, including vehicle platforms classified as a Society of Automotive Engineers (SAE) Level 2, 3, 4 or 5 vehicle. SAE Level 2, for example, allows for unassisted and partially assisted driving with sufficient automation for limited vehicle control, such as auto steer and full-speed range active cruise control (FSRACC), while obliging immediate driver intervention. At the upper end of the spectrum is Level 5 automation that altogether eliminates human intervention from vehicle driving operation, e.g., eliminating the steering wheel, throttle and brake pedals, shift knob, etc.

In an example, a motor vehicle is presented that includes a vehicle body with multiple road wheels and other standard original equipment. A prime mover, which may be embodied as an internal combustion engine (ICE) assembly and/or an electric traction motor, is mounted to the vehicle body and operates to drive one or more of the road wheels to thereby propel the vehicle. A target object detection system, which may be embodied as a wide aperture radar system operating along or in conjunction with another suitable object detection technology, is also mounted to the vehicle body. The target object detection system includes an electronic transmitter and receiver, which may be embodied as a single electromagnetic transceiver unit or as discrete transmitter and receiver devices.

Continuing with the above example, the motor vehicle also includes a vehicle controller, which may be embodied as an electronic control unit or a network of distributed controllers or control modules that regulate operation of one or more resident vehicle systems. The vehicle controller is programmed to command the electronic transmitter to emit an electromagnetic signal; the electronic receiver receives multiple reflection echoes caused by the electromagnetic signal reflecting off of target objects within proximity of the motor vehicle. Based on these received reflection echoes, the controller determines a relative velocity vector for each target object, and assigns the relative velocity vectors to discrete velocity vector clusters. A host vehicle velocity vector of the motor vehicle is estimated as an average of the relative velocity vectors in a select one of the velocity vector clusters that contains the most relative velocity vectors and has the largest spatial spread. The vehicle controller then commands at least one resident vehicle system to execute one or more control operations based on the estimated host vehicle velocity vector.

Additional aspects of the present disclosure are directed to techniques, algorithms, and logic for operating or manufacturing any of the disclosed vehicles, systems and devices. Aspects of the present disclosure are also directed to target object detection systems and automated or autonomous control systems for governing operation of vehicle systems. Also presented herein are non-transitory, computer readable media storing instructions executable by at least one of one or more processors of one or more programmable control units, such as an electronic control unit (ECU) or control module, to govern operation of a disclosed vehicle, system or device.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 2 is a diagrammatic illustration of a representative occupancy grid map showing a host vehicle with a wide aperture radar system provisioning target object tracking and velocity vector estimation in accord with aspects of the disclosed concepts.

FIG. 3 is a graph of target object relative velocities showing the respective relative velocity vectors of the target objects of FIG. 3 grouped into discrete vector clusters in accord with aspects of the disclosed concepts.

Figure 1:
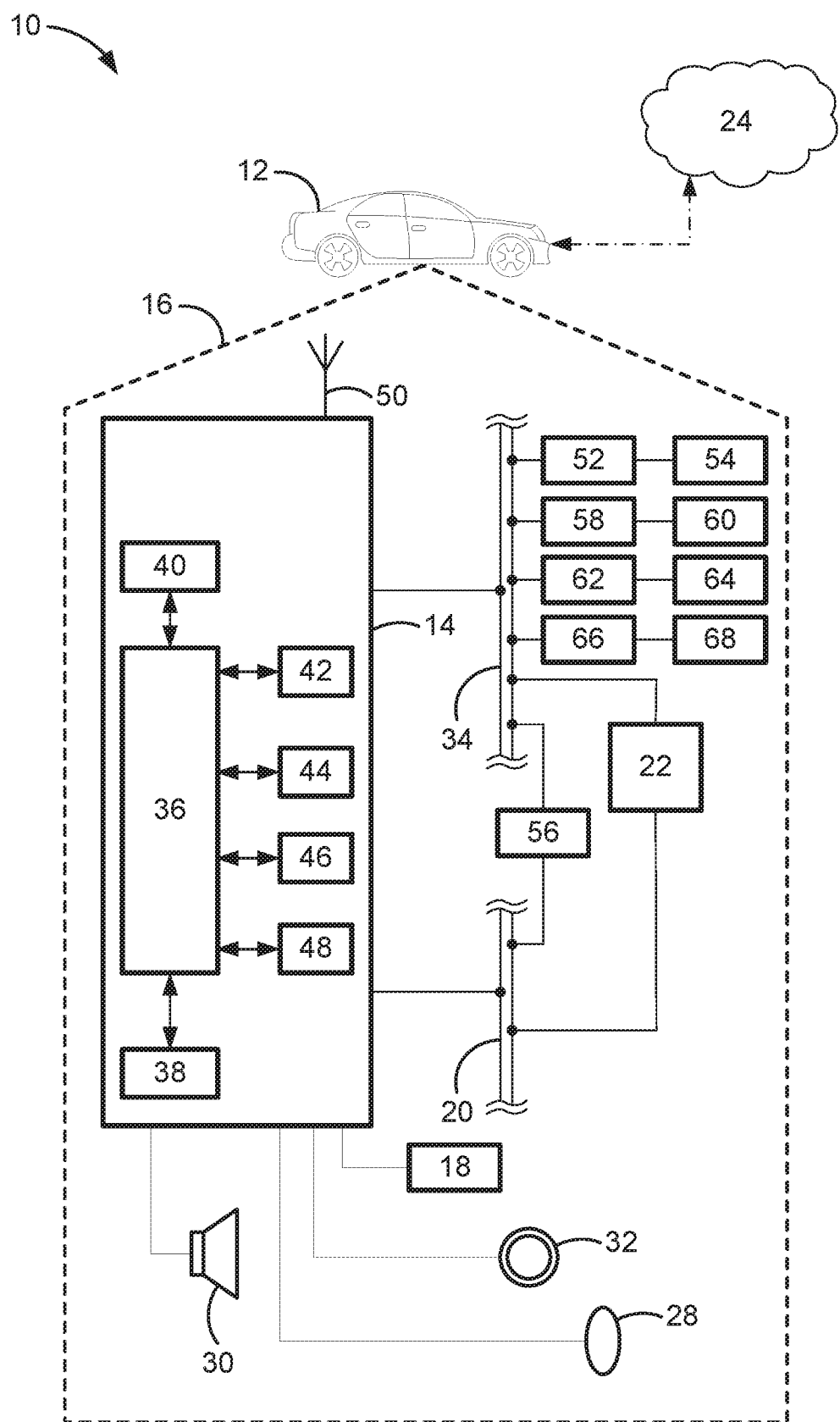
FIG. 1 is a partially schematic, side-view illustration of a representative motor vehicle with a network of in-vehicle controllers, sensing devices, and communication devices for executing automated driving operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a representative automobile, which is designated generally at 10 and portrayed herein for purposes of discussion as a sedan-style passenger vehicle. Packaged on a vehicle body 12 of the automobile 10, e.g., distributed throughout the different vehicle compartments, is an onboard network of electronic devices for executing one or more automated or autonomous driving operations. The illustrated automobile 10—also referred to herein as "motor vehicle" or "vehicle" for short—is merely an exemplary application with which aspects and features of this disclosure may be practiced. In the same vein, implementation of the present concepts for the specific autonomous driving systems and operations discussed below should also be appreciated as exemplary applications of novel features disclosed herein. As such, it will be understood that aspects and features of this disclosure may be applied to other automated driving system architectures, utilized for other automated driving operations, and implemented for any logically relevant type of motor vehicle. Moreover, only select components of the automated driving systems and vehicles are shown and will be described in additional detail herein. Nevertheless, the vehicles and system architectures discussed herein may include numerous additional and alternative features, and other available peripheral components, for example, for carrying out the various methods and functions of this disclosure.

The representative vehicle 10 of FIG. 1 is originally equipped with a vehicle telecommunication and information ("telematics") unit 14 that wirelessly communicates (e.g., via cell towers, base stations, mobile switching centers, satellite service, etc.) with a remotely located or "off-board" cloud computing system 24. Some of the other vehicle hardware components 16 shown generally in FIG. 1 include, as non-limiting examples, an electronic video display device 18, a microphone 28, one or more audio speakers 30, and assorted input controls 32 (e.g., buttons, knobs, switches, touchpads, keyboards, touchscreens, etc.). Generally, these hardware components 16 function, in part, as a human/machine interface (HMI) to enable a user to communicate with the telematics unit 14 and other systems and system components within the vehicle 10. Microphone 28 provides a vehicle occupant with means to input verbal or other auditory commands; the vehicle 10 may be equipped with an embedded voice-processing unit utilizing audio filtering, editing, and analysis software modules. Conversely, speaker 30 provides audible output to a vehicle occupant and may be either a stand-alone speaker dedicated for use with the telematics unit 14 or may be part of audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, internal/external parallel/serial communication bus, a local area network (LAN) interface, a controller area network (CAN), a media-oriented system transfer (MOST), a local interconnection network (LIN) interface, and the like. Other appropriate communication interfaces may include those that conform with ISO, SAE, and IEEE standards and specifications. The network connection interface 34 enables the vehicle hardware 16 to send and receive signals with each other and with various systems and subsystems both within or "resident" to the vehicle body 12 and outside or "remote" from the vehicle body 12. This allows the vehicle 10 to perform various vehicle functions, such as controlling vehicle steering, governing operation of the vehicle's transmission, controlling engine throttle, engaging/disengaging the brake system, and other automated driving functions. For instance, telematics unit 14 receives and/or transmits data to/from an autonomous systems control module (ACM) 52, an engine control module (ECM) 54, a powertrain control module (PCM) 56, sensor interface module(s) 58, a brake system control module (BSCM) 60, and assorted other vehicle ECUs, such as a transmission control module (TCM), a climate control module (CCM), etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to one or more electronic memory devices 38, each of which may take on the form of a CD-ROM, magnetic disk, IC device, semiconductor memory (e.g., various types of RAM or ROM), etc., and a real-time clock (RTC) 42. Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. It should be understood that the vehicle 10 may be implemented without one or more of the above listed components, or may include additional components and functionality as desired for a particular end use. The various communication devices described above may be configured to exchange data as part of a periodic broadcast in a V2V communication system or a vehicle-to-everything (V2X) communication system, e.g., Vehicle-to-Infrastructure (V2I), Vehicle-to-Pedestrian (V2P), and/or Vehicle-to-Device (V2D).

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation.

Digital camera 62 may use a charge coupled device (CCD) sensor or other suitable optical sensor to generate images indicating a field-of-view of the vehicle 10, and may be configured for continuous image generation, e.g., at least about 35 images generated per second. By way of comparison, range sensor 64 may emit and detect reflected radio, infrared, light-based or other electromagnetic signals (e.g., radar, EM inductive, Light Detection and Ranging (LIDAR), etc.) to detect, for example, presence, geometric dimensions, and/or proximity of an object. Vehicle speed sensor 66 may take on various forms, including wheel speed sensors that measure wheel speeds, which are then used to determine real-time vehicle speed. In addition, the vehicle dynamics sensor 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameter. Using data from the sensing devices 62, 64, 66, 68, the CPU 36 identifies surrounding driving conditions, determines characteristics of road surface conditions, identifies objects within a detectable range of the vehicle 10, determines attributes of the target object, such as size, relative position, angle of approach, relative speed, etc., and executes automated control maneuvers based on these executed operations.

These sensors are distributed throughout the motor vehicle 10 in operatively unobstructed positions relative to views fore and aft or on port and starboard sides of the vehicle. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

FIG. 2 diagrammatically illustrates an occupancy grid map 100 showing a host vehicle 110, which is equipped with a wide aperture radar system 112, traveling through an exemplary driving environment while provisioning target object tracking and host vehicle velocity vector estimation. Although differing in appearance, the vehicle 110 of FIG. 2 may take on any of the options and alternatives described above with respect to the motor vehicle 10 of FIG. 1, and vice versa. Dispersed throughout the surrounding driving environment of the host vehicle 110 is an assortment of stationary objects, such as buildings 101A-101D and parked vehicles 103A-103F, and an assortment of moving objects, such as the three automobiles 105A-105C traveling through a roadway intersection forward of the host vehicle 110. Clearly, the driving environment through which host vehicle 110 travels may comprise any number, combination and arrangement of static and moving objects, including urban and rural settings, highway and roadway driving, pedestrian-dense and vehicle-only scenarios, etc.

As the host vehicle 110 travels through the driving environment, an electronic "impulse" radio wave transmitter 114 of the radar system 112 radiates electromagnetic signals, namely W-band radio wave pulses with a frequency range of approximately 70-120 GHz with a modulated pulse repetition frequency (PRF). After the transmitted radar signals contact one or more of the objects 101A-101D, 103A-103F, and 105A-105C on or near the road across which the vehicle 10 is travelling, they are reflected/redirected back towards the radar system 112. These reflected/redirected radar signals are received by an electronic radio receiver, such as first and second wide aperture antenna arrays 116A and 116B. The transmitter 114 and receivers 116A, 116B are portrayed in FIG. 2 as discrete components; however, it is anticipated that they be combined into a unitary, steerable radio transceiver array in which an antenna operates as both transmitter and receiver.

The stream of impulses radiated by the radio wave transmitter 114, whose beam direction may be governed by a suitable actuator and beam steering module, are reflected by target objects and background clutter and received by the antenna arrays 116A and 116B, each of which may provide a common wide aperture for transmission and reception. Received signals may then be amplified via a wideband amplifier before being passed onto a digital signal processor that carries out analog-to-digital conversion, velocity filtering, data fusion, coherent integration, and motion compensation of the impulse signals. Processed signals output from the digital signal processor may thereafter be passed to a target post processor, where target parameters such as target range, relative target speed and trajectory, target angle of attack, and target tracking and identification are determined. Digitized samples are thereafter placed into complementary bit locations of a random-access memory (RAM) capable of receiving inputs, e.g., at an eight-nanosecond rate (~125 MSPS). In at least some disclosed wide-aperture radar systems, sub-aperture processing may be employed to facilitate a long coherent processing interval (CPI) or to implement wide-swath mode imaging.

While it is envisioned that target object detection systems and host vehicle velocity estimation techniques set forth herein may be implemented through any suitable target object detection technique, including LIDAR, LADAR, short aperture radar, and the like, many disclosed features are most effective by way of implementation through wide aperture radar systems. Wide-Aperture Synthetic Aperture Radar (WASAR) may be typified as a radar system employing a synthesized aperture whose angular extent exceeds the sector required for equal resolution in range and cross-range (e.g., bandwidth of approximately 75-80 GHz with an aperture size of approximately 40-50 cm). A very large aperture may be computationally synthesized using data recorded from the radar echoes of a series of radar transmissions. This large synthetic aperture provides fine resolution in the direction of motion while a large bandwidth provides fine resolution in range. For instance, wide aperture radar systems with wide aperture antenna arrays with widely spaced antenna elements, such as spacing larger than half a wavelength, may provision high-resolution imagery at a relatively low cost. Another advantage of utilizing multiple antenna arrays with widely spaced antenna elements is the ability to eliminate ghost targets. Multiple antenna arrays which utilize such antenna spacing can be used with multiple radars since any attendant ambiguities in the angle measurements due to the widely spaced elements can be resolved by intersecting the grating lobes from multiple radars. A wideband signal, with its inherent high-range resolution, provides the capability to resolve individual scattering centers of a complex target and thereby produce a target's unique radar signature. The use of a filter matched to the expected received waveform can result in enhanced detection capability, target identification, and discrimination of unwanted false targets.

Figure 4:
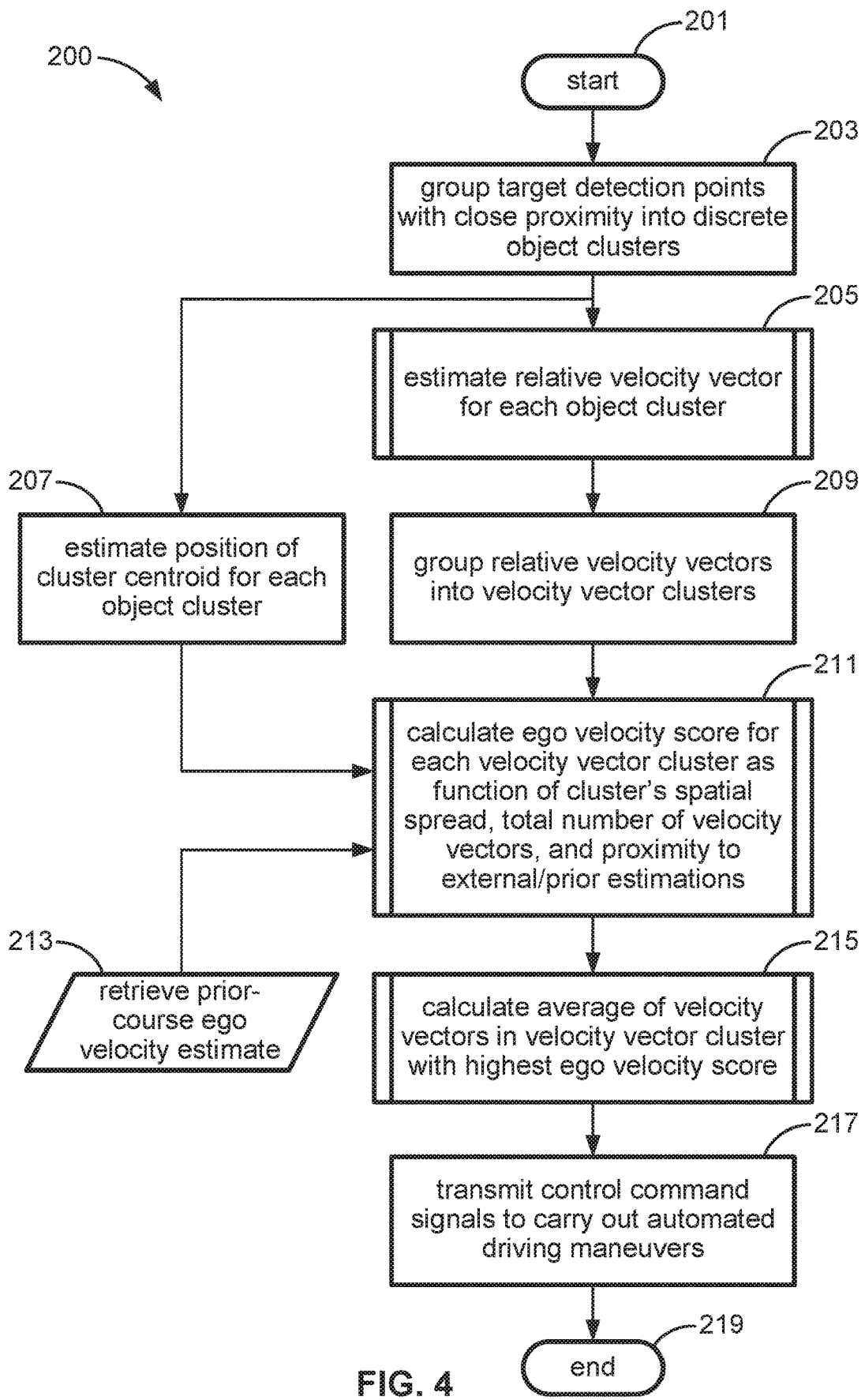
FIG. 4 is a flowchart illustrating a representative target object tracking and ego-motion estimation protocol for deriving host vehicle velocity vectors, which may correspond to memory-stored instructions executed by an onboard or remote controller, control-logic circuitry, programmable electronic control unit, or other integrated circuit (IC) device or a network of IC devices in accord with aspects of the disclosed concepts.

With reference now to the flow chart of FIG. 4, an improved method or control strategy for tracking target objects, such as objects 101A-101D, 103A-103F, and 105A-105C of FIG. 2, and deriving velocity vectors of host vehicles, such as vehicles 10 and 110 of FIGS. 1 and 2, is generally described at 200 in accordance with aspects of the present disclosure. Some or all of the operations illustrated in FIG. 4 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 4 with processor-executable instructions for a programmable controller or control module or similarly suitable processor to call up an initialization procedure for a target object detection protocol. This routine may be executed in real-time, continuously, systematically, sporadically, and/or at regular intervals, for example, each 100 milliseconds, during active or autonomous vehicle operation. As yet another option, block 201 may initialize responsive to a user prompt from an occupant of the vehicle or a broadcast prompt signal from a backend or middleware computing node tasked with collecting, analyzing, sorting, storing and distributing vehicle data. To carry out this protocol, a vehicle control system or any combination of one or more subsystems may be operable to receive, process, and synthesize pertinent information and inputs, and execute control logic and algorithms to regulate various powertrain system, steering system, brake system, fuel system, and/or battery system components to achieve desired control targets.

As part of the initialization procedure at block 201, for example, a resident vehicle telematics unit or other similarly suitable Human Machine Interface (HMI) may execute a navigation processing code segment, e.g., to obtain vehicle data (e.g., geospatial data, speed, heading, acceleration, timestamp, etc.), and optionally display select aspects of this data to an occupant of the vehicle 10, 110, e.g., via video display device 18 of telematics unit 14. The occupant may employ any of the HMI input controls 32 to then select a desired destination and, optionally, one or more detour stops for the vehicle from a current location or an expected origin. Path plan data may be generated with a predicted path for the vehicle to travel from origin to destination. It is also envisioned that the ECU or telematics unit processors receive vehicle origin and vehicle destination information from other sources, such as a server-class computer provisioning data exchanges for a cloud computing system or a dedicated mobile software application operating on a smartphone or other handheld computing device.

Upon initialization of the control protocol at block 201, method 200 proceeds to process block 203 with memory-stored, processor-executable instructions to identify and group target object detection points into discrete object clusters. As indicated above, an electronic transmitter of a host vehicle's target object detection system discharges an electromagnetic signal as the vehicle travels along a desired route. An electronic receiver of the target object detection system senses signal echoes caused by the electromagnetic signal reflecting off of target objects within proximity of the host vehicle. Due to variations in target size, geometry, and orientation, each target object may engender several detection points, each of which produces a resultant reflection echo. FIG. 2 depicts a driving environment wherein the target objects 101A-101D, 103A-103F, and 105A-105C are displayed with target detection points resulting from a number of radar cycles. By way of non-limiting example, each static buildings 101A-101D has between five and seven detection points, illustrated in FIG. 2 as empty circles located on facing surfaces of the building structures. Comparatively, the stopped and traveling vehicles 103A-103F and 105A-105C, respectively, each has between three and four detection points, also portrayed as empty circles. Detected targets may propagate numerous detection points due to the large size of the object with respect to the radar's spatial resolution.

The ability to accurately pinpoint and classify objects may be partially dependent on the observation interval and signal pulse modulation; as such, static clutter can oftentimes be localized more accurately than moving targets. The ability to accurately detect and localize static clutter may be exploited to "clean up" a cluttered scene in order to improve target object detection and localization. At process block 203, all of the detection points within a given prediction time interval for a given route are grouped into discrete object clusters (indicated by hidden circles 107A-107M in FIG. 2) based on the relative proximities and/or relative velocities of the detection points with respect to one another. The detection points may be deemed "proximal" or "adjacent" if their mapped locations (e.g., radar estimates of individual object's position (range, azimuth, elevation) with respect to the radar's position) are within a predetermined proximity to one another. As another option, the method 200 may be operative to assemble detection points into object clusters further in response to the velocity vectors of the detection points being substantially equal. For example, if a subset of perceived detection points are proximate to each other and have similar velocities, it may be assumed that these detections are all on the same object. Concomitantly, this cluster of detection points may be saved in cache memory as a single object for tracking purposes and future reference.

With continuing reference to FIG. 4, the method 200 estimates a respective relative velocity vector for each object cluster, as indicated by predefined process block 205, and contemporaneously estimates the position of cluster centroid for each object cluster, as indicated by process block 207. Cluster centroid position may be estimated by taking the mathematical average of all or a select subset of the respective locations of the reflection points in the subject object cluster. FIG. 2 illustrates thirteen (13) cluster centroids, one for each target object 101A-101D, 103A-103F, and 105A-105C; these cluster centroids are depicted as solid circles within the object clusters 107A-107M. In at least some embodiments, determining the relative velocity vector for a subject object may encompass estimating a velocity vector for the cluster centroid of the object cluster corresponding to that target object. In this regard, the velocity vector for an object cluster is calculated relative to a corresponding position, speed and trajectory of the host vehicle at the time of evaluation. FIG. 2 illustrates thirteen (13) relative velocity vectors, one for each object cluster 107A-107M; each relative velocity vector is depicted as a solid arrow projecting from a related centroid.

Continuing with the foregoing discussion, each of the reflection echoes may be delineated into interrelated echo projections, such as first and second echo projections 109A and 109B in FIG. 2, resulting from multiple antenna arrays 116A, 116B detecting a single radar pulse output by impulse radio wave transmitter 114. An estimated Doppler frequency—detection point Doppler frequency vector f (shown below)—and an estimated angle of arrival—detection point azimuth angle matrix H (shown below)—are derived for each reflection echo based on its corresponding echo projections:

$$f = \begin{bmatrix} f_1 \\ f_2 \\ \vdots \end{bmatrix}; H = \begin{bmatrix} \sin(\theta_1) & \cos(\theta_1) \\ \sin(\theta_2) & \cos(\theta_2) \\ \vdots & \vdots \end{bmatrix}$$

where the relation of Doppler frequency to azimuth angle and velocity vector may be characterized as:

$$\begin{bmatrix} f_1 \\ f_2 \\ \vdots \end{bmatrix} = \begin{bmatrix} \sin(\theta_1) & \cos(\theta_1) \\ \sin(\theta_2) & \cos(\theta_2) \\ \vdots & \vdots \end{bmatrix} \begin{bmatrix} v_x \\ v_y \end{bmatrix}$$

where $f_i$ is a Doppler frequency of the $i^{th}$ detection point; $\theta_i$ is an angle of the $i^{th}$ detection point; and $v_x$ and $v_y$ are vector coordinates indicative of the estimated velocity vector. Using this data, the relative velocity vector is calculated as an estimated velocity vector $\hat{v}$ as follows:

$$\hat{v} = (H^T H + \sigma I)^{-1} H^T f$$

where $H^T$ is a transpose of the azimuth angle matrix H; σ is a regularization factor; and I is an inversion factor. Regularization factor σ helps to provide numerical stabilization for inversion of the matrix $H^T \cdot H$, e.g., for scenarios in which that matrix has an ill condition.

Once the object detection points are identified and clustered (block 203), the object cluster velocity vectors are estimated (block 205), and the cluster centroids are located (block 207), the method 200 advances to process block 209 and groups the velocity vectors into discrete vector clusters. FIG. 3, for example, is a Cartesian graph of target object relative velocities (in miles per hour (mph)) with longitudinal velocity ($V_x$) on the x-axis and lateral velocity ($V_y$) on the y-axis. The relative velocity vectors for the target objects 101A-101D, 103A-103F, and 105A-105C of FIG. 2 are broken down into their respective lateral and longitudinal vector components, and then mapped to the relative velocity graph 120 based on a respective velocity coordinate sets ($V_x$, $V_y$). After all of target objects' velocity vectors are mapped, it can be seen that the ten (10) static objects tend to congregate around a common area, e.g., on the lower right-hand side of the graph 120, whereas the three (3) moving objects tend to be dispersed to isolated areas, e.g., on the upper left and right-hand sides of the graph 120. The method 200 proceeds to generate discrete vector clusters—labelled 120A-120C in FIG. 3—as a function of the spatial spread between proximal ones of the velocity coordinate sets on the velocity graph 120. Each vector cluster 120A-120C has a respective centroid and a respective spatial spread, such as static vector cluster centroid 121 and spatial spread 123.

Predefined process block 211 calculates a respective ego velocity score for each vector cluster based, at least in part, on the total number of relative velocity vectors contained in that vector cluster, a variance of detections of the spatial position of the centroid associated with each relative velocity vector in that vector cluster, and the proximity of the estimated vehicle velocity to a prior course ego velocity estimate. At input/output block 213, prior-course ego velocity estimation data is received/retrieved, e.g., from resident memory devices 38 or remote cloud computing system 24. Prior-course ego velocity estimate data may optionally be embodied as an input to the ADAS system from a vehicle dynamics sensor or from vehicle audiometry measurements. The ego velocity score for each of vector cluster may then be calculated as:

$$S = \alpha N + \beta \frac{1}{N} \sum_{n=1}^{N} \left\| p_i - \frac{1}{N} \sum_{n=1}^{N} p_i \right\|^2 - \gamma \left\| v_{pr} - \frac{1}{N} \sum_{n=1}^{N} v_i \right\|^2$$

where S is the ego velocity score; N is the number of the relative velocity vectors in the vector cluster; $v_i$ is an $i^{th}$ velocity vector in the vector cluster; $p_i$ is a centroid position of detection points associated with the $i^{th}$ velocity vector; $v_{pr}$ is a prior course estimation of ego-velocity; $\alpha$ and $\gamma$ and $\beta$ are weighting factors. The vector clusters 120A-120B may then be ranked in a hierarchical manner from highest ego score to lowest ego score.

Advancing from predefined process block 211 to predefined process block 215, the method 200 of FIG. 4 estimates a vehicle velocity vector of the host vehicle. A host vehicle's velocity vector may be calculated as a mathematical average of the relative velocity vectors contained in the vector cluster having the highest ego score, namely the cluster containing the most relative velocity vectors and having the largest spatial spread. The average of the relative velocity vectors may be calculated as a standard mean:

$$\mu = \sum_{n=1}^{N} v_i$$

a weighted mean:

$$\mu = \sum_{n=1}^{N} w_i v_i$$

or a median $$\text{Median}(v_0, v_1, \ldots, v_N)$$

of the relative velocity vectors in the selected vector cluster with the highest ego score. The weight factor $w_i$ may be proportional to a confidence of the velocity that it multiplies; the confidence may be obtained, for example, by the SNR of the detection points that are associated with the estimation of the particular velocity ($v_i$) (higher SNR indicates higher confidence in accuracy of the velocity estimation).

Process block 217 is accompanied by instructions to transmit one or more command signals to a resident vehicle subsystem, such as resident vehicle navigation or brake and steering, to execute one or more control operations associated with the estimated host vehicle velocity vector. The resident vehicle subsystem may be embodied as an autonomous driving control module that is operable to automate driving of the motor vehicle. In this instance, the vehicle control operation may include automating driving of the motor vehicle (e.g., steering, throttle, braking, headway, maneuvering, etc.) to complete a selected predicted route. As a further option, the resident vehicle subsystem may be embodied as an ADAS control module that is operable to automate select driving operations of the vehicle. In this instance, the control operation may include executing a controller-automated driving maneuver to complete at least a portion of a selected route based on the host vehicle's velocity vector. As another option, the resident vehicle subsystem may be embodied as a resident vehicle navigation system with electronic input and display devices. In this instance, the vehicle control operation may include the display device displaying a predicted route contemporaneous with the estimated ego velocity. The input device may receive a user command to determine an alternative route for driving the motor vehicle. At this juncture, the method 200 of FIG. 4 may advance from process block 217 to terminal block 219 and terminate, or may loop back to terminal block 201 and run in a continuous loop.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling automated operations of a motor vehicle, the method comprising:
   emitting, via an electronic transmitter of a target object detection system of the motor vehicle, an electromagnetic signal;
   receiving, via an electronic receiver of the target object detection system, multiple reflection echoes caused by the electromagnetic signal reflecting off of multiple target objects within proximity of the motor vehicle;
   determining, via a vehicle controller based on the received reflection echoes, a relative velocity vector for each of the target objects;
   assigning the relative velocity vectors to discrete velocity vector clusters, each of the velocity vector clusters having a respective centroid and a respective spatial spread of the relative velocity vectors in the velocity vector cluster to the centroid;
   estimating a host vehicle velocity vector of the motor vehicle as an average of the relative velocity vectors in a select one of the velocity vector clusters containing a majority of the relative velocity vectors and having a largest of the spatial spreads; and
   transmitting, via the vehicle controller, a command signal to a resident vehicle system resident to the motor vehicle to execute a control operation acting on the motor vehicle responsive to the estimated host vehicle velocity vector.

2. The method of claim 1, wherein each of the target objects includes multiple detection points causing a plurality of the reflection echoes, each of the detection points corresponding to a respective one of the reflection echoes, the method further comprising identifying each of the target objects by assigning the detection points to discrete object clusters based on relative proximities of the detection points to one another.

3. The method of claim 2, further comprising determining, for each of the reflection echoes, an estimated Doppler frequency and an estimated angle of arrival.

4. The method of claim 3, further comprising estimating a respective position of a cluster centroid for each of the object clusters, wherein determining the relative velocity vector for each of the target objects includes estimating a velocity vector for the cluster centroid from the estimated angles and Doppler frequencies of the detection points in the object cluster corresponding to the target object.

5. The method of claim 4, wherein determining the relative velocity vectors includes calculating, for each of the target objects, an estimated velocity vector $\hat{v}$ as:

$$\hat{v} = (H^T H + \sigma I)^{-1} H^T f$$

where H is an azimuth angle matrix of the detection points; $H^T$ is a transpose of the azimuth angle matrix H; $\sigma$ is a regularization factor; f is a vector of Doppler frequencies of the detection points; and I is an inversion factor.

6. The method of claim 1, further comprising calculating, for each of the velocity vector clusters, a respective ego velocity score based on: a number of the relative velocity vectors in the velocity vector cluster; a variance of detections of a spatial position of a centroid associated with each relative velocity vector in the velocity vector cluster; and a proximity to a prior course ego velocity estimate.

7. The method of claim 6, wherein the ego velocity score for each of the velocity vector clusters is calculated as:

$$S = \alpha N + \beta \frac{1}{N} \sum_{n=1}^{N} \left\| p_i - \frac{1}{N} \sum_{n=1}^{N} p_i \right\|^2 - \gamma \left\| v_{pr} - \frac{1}{N} \sum_{n=1}^{N} v_i \right\|^2$$

where S is the ego velocity score; N is the number of the relative velocity vectors in the velocity vector cluster; $v_i$ is an $i^{th}$ velocity vector in the velocity vector cluster; $p_i$ is a centroid position of detection points associated with the $i^{th}$ velocity vector; $v_{pr}$ is the prior course ego velocity estimate; and $\alpha$ and $\gamma$ and $\beta$ are weighting factors.

8. The method of claim 1, wherein the average of the relative velocity vectors is calculated as a standard mean, a weighted mean, or a median of the relative velocity vectors in the select one of the velocity vector clusters.

9. The method of claim 1, further comprising mapping each of the relative velocity vectors to a Cartesian velocity graph based on a respective velocity coordinate set ($V_x$, $V_y$) of the relative velocity vector, wherein assigning the relative velocity vectors to the velocity vector clusters includes generating the discrete velocity vector clusters as a function of the spatial spread between proximal ones of the velocity coordinate sets on the Cartesian velocity graph.

10. The method of claim 1, wherein the resident vehicle system includes an autonomous driving control module operable to automate driving of the motor vehicle, the control operation including automating driving of the motor vehicle to complete a planned route based on the estimated host vehicle velocity vector.

11. The method of claim 1, wherein the resident vehicle system includes an Advanced Driver Assistance System (ADAS) control module operable to automate control of the motor vehicle, the control operation including executing a braking, steering, and/or acceleration maneuver of the motor vehicle based on the estimated host vehicle velocity vector.

12. The method of claim 1, wherein the resident vehicle system includes a vehicle navigation system with a display device mounted inside the motor vehicle, the control operation including displaying, via the display device, indicators for the target objects within proximity of the motor vehicle.

13. The method of claim 1, wherein the target object detection system includes a wide aperture radar system, the electronic transmitter includes a radio wave transmitter, and the electronic receiver includes multiple wide aperture antenna arrays.

14. A motor vehicle comprising:
   a vehicle body with a plurality of road wheels mounted to the vehicle body;
   a prime mover attached to the vehicle body and configured to drive one or more of the road wheels to thereby propel the motor vehicle;
   a target object detection system mounted to the vehicle body and including an electronic transmitter and an electronic receiver; and
   a vehicle controller operatively connected to the target object detection system, the vehicle controller being programmed to:
      command the electronic transmitter to emit an electromagnetic signal;

receive, via the electronic receiver, multiple reflection echoes caused by the electromagnetic signal reflecting off of multiple target objects within proximity of the motor vehicle;

determine, based on the received reflection echoes, a relative velocity vector for each of the target objects;

assign the relative velocity vectors to discrete velocity vector clusters, each of the velocity vector clusters having a respective centroid and a respective spatial spread of the relative velocity vectors in the velocity vector cluster to the centroid;

estimate a host vehicle velocity vector of the motor vehicle as an average of the relative velocity vectors in a select one of the velocity vector clusters containing a majority of the relative velocity vectors and having a largest of the spatial spreads; and transmit a command signal to a resident vehicle system resident to the motor vehicle to execute a control operation acting on the motor vehicle responsive to the estimated host vehicle velocity vector.

15. The motor vehicle of claim 14, wherein each of the target objects includes multiple detection points causing a plurality of the reflection echoes, each of the detection points corresponding to a respective one of the reflection echoes, the vehicle controller being further programmed to identify each of the target objects by assigning the detection points to discrete object clusters based on relative proximities of the detection points to one another.

16. The motor vehicle of claim 15, wherein the vehicle controller is further programmed to determine, for each of the reflection echoes, an estimated Doppler frequency and an estimated angle of arrival.

17. The motor vehicle of claim 16, wherein the vehicle controller is further programmed to estimate a respective position of a cluster centroid for each of the object clusters, wherein determining the relative velocity vector for each of the target objects includes estimating a velocity vector for the cluster centroid from the estimated angles and Doppler frequencies of the detection points in the object cluster corresponding to the target object.

18. The motor vehicle of claim 14, wherein the vehicle controller is further programmed to calculate, for each of the velocity vector clusters, a respective ego velocity score based on: a number of the relative velocity vectors in the velocity vector cluster; a variance of detections of a spatial position of a centroid associated with each relative velocity vector in the velocity vector cluster; and a proximity to a prior course ego velocity estimate.

19. The motor vehicle of claim 14, wherein the average of the relative velocity vectors is calculated as a standard mean, a weighted mean, or a median of the relative velocity vectors in the select one of the velocity vector clusters.

20. The motor vehicle of claim 14, wherein the target object detection system includes a wide aperture radar system, the electronic transmitter includes a radio wave transmitter, and the electronic receiver includes multiple wide aperture antenna arrays.

* * * * *